June 14, 1949.  H. GELB  2,473,023
HALFTONE SCREEN HOLDER
Filed Sept. 11, 1944  2 Sheets-Sheet 1
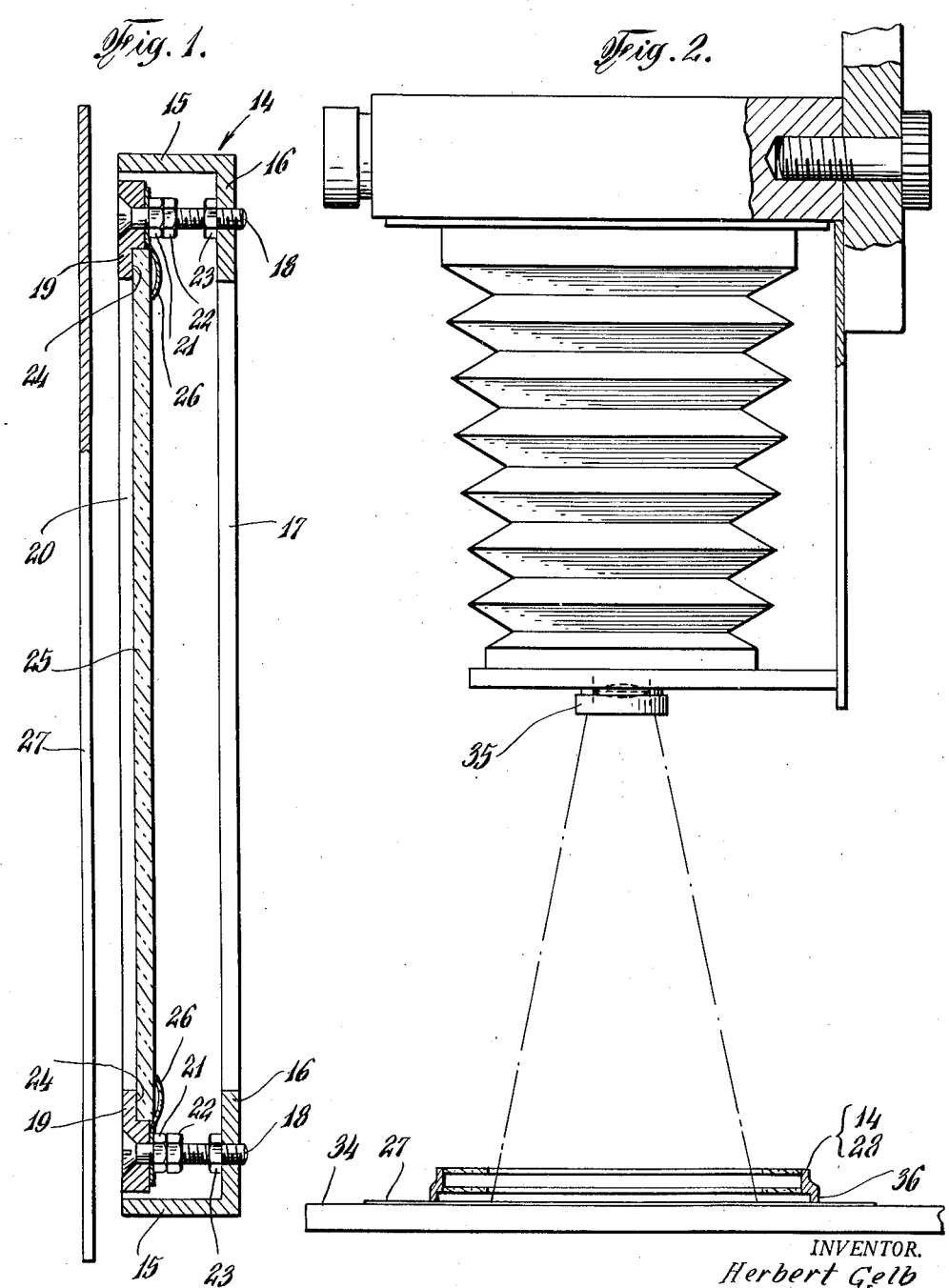
INVENTOR.
Herbert Gelb
BY
W. Lee Helms
ATTORNEY June 14, 1949.     H. GELB     2,473,023
HALFTONE SCREEN HOLDER
Filed Sept. 11, 1944     2 Sheets-Sheet 2
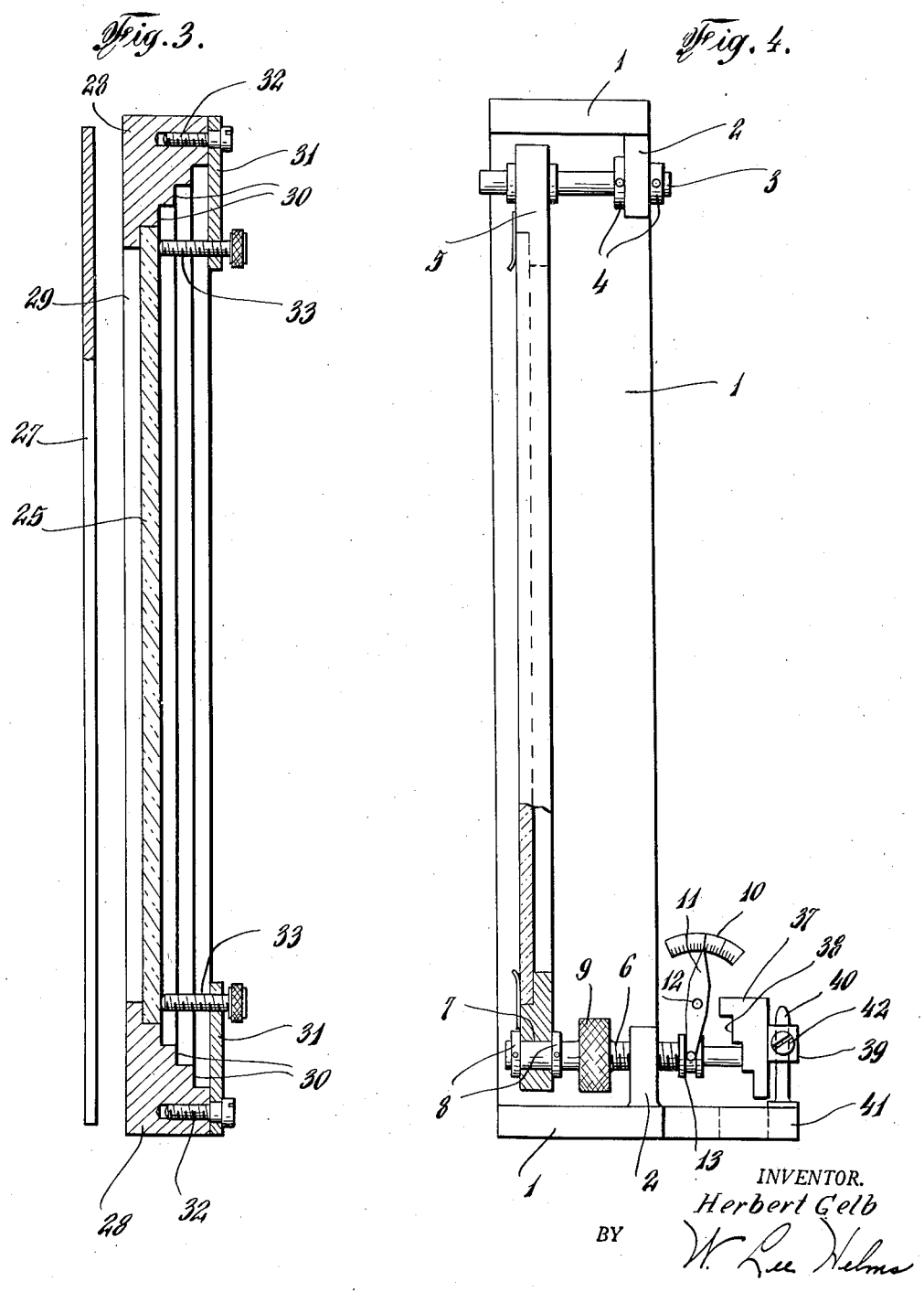
INVENTOR.
Herbert Gelb

UNITED STATES PATENT OFFICE 2,473,023

HALFTONE SCREEN HOLDER

Herbert Gelb, New York, N. Y., assignor to Joseph Gelb, doing business as Joseph Gelb Company, New York, N. Y.

Application September 11, 1944, Serial No. 553,488

4 Claims. (Cl. 95—81)

This invention relates to photographic equipment used in preparing half-tone plates, and more particularly to a holder for the screens used in their preparation. In the art of preparing half-tone, a transparent screen having a plurality of closely spaced lines running in two directions normal to each other to present a lattice network is interposed between the sensitized plate and the lens of the camera. The purpose of the screen is to break up the image recorded on the sensitized plate into a large number of dot areas, which, when the engraved printing plate is made from the photographic plate, presents raised areas which receive and hold the ink in printing.

The spacing of the lines in the screen depends upon the character of the half-tone to be prepared, such screens being rated by the number of parallel lines per linear inch, such as 60, 110, 120, 133, etc. A selected screen of the proper number of lines is placed in a screen holder which, under the present practice, is implemented with mechanical devices for adjusting the distance between the emulsion surface of the sensitized plate and the center line of the screen, this distance being predetermined and fixed dependent upon the particular line screen being used.

By reason of the large relative size of the screen holder compared with the thickness of the screen and small distance separating the screen and the emulsion face of the sensitized plate, this type of mechanically adjusted screen holder is open to a number of objections, principally, that the screen is not uniformly spaced at all points from the sensitized plate, and also the difficulty of setting the device precisely to the aforesaid critical distance by reason of the fact that the setting must be made with the aid of scale readings.

The object of this invention is to provide a screen holder which will overcome these objections and which may be more cheaply made to serve the intended purpose. Another object is to provide a screen holder which besides being adapted for use in a process camera in the usual manner, may also be employed in preparing half-tone printing plates by the use of projecting equipment such as an enlarger.

A further object of the invention is to provide means which may be used in the present type of mechanically adjustable screen holder for the purpose of making the adjustment of the aforesaid critical distance more accurate and facile. For the attainment of the aforesaid and such other objects as may be pointed out or appear herein, I have shown a number of embodiments of my invention in the accompanying drawing, wherein—

Fig. 1 is an elevational section through the improved screen holder;

Fig. 2 shows the use of the improved screen holder in conjunction with an enlarger;

Fig. 3 is an elevational view through a modified form of improved screen holder; and Fig. 4 is an elevational view through a screen holder of the present type implemented with an improved adjusting means.

One type of screen holder now in use shown in Fig. 4 comprises a rectangular open frame 1 provided at four points close to its four corners with inwardly projecting brackets 2. Three of the four brackets 2, such as the upper one shown in Fig. 4, serve to support guide pins 3 which are passed through suitable apertures in the brackets and held securely to the bracket as by collars 4 force fitted on the pins. A screen sub-holder 5 is provided at three of its corners with apertures to slidably receive the supporting or guide pins 4. The fourth bracket 2 of the main frame is tapped to receive a lead screw 6, the forward (leftward, in Fig. 4) end of which is received in an aperture 7 of the sub-frame 5, and provided with collars 8 so that, while the forward end of lead screw 6 may rotate in aperture 7, axial movement of the lead screw will cause this movement to be imparted to sub-frame 5. A knurled nut 9 is formed in or secured to lead-screw 6 to enable the screw to be turned to regulate the distance of sub-frame 5 from the front (left, Fig. 4) of main frame 1. A scale 10 calibrated in terms of this distance cooperates with a pointer 11 pivotly mounted on main frame 1 at 12. The lower end of pointer 11 is bifurcated and received in the channel of a flanged collar 13 formed in or secured to lead-screw 6.

Hence, by manipulating the knurled-nut 9, the screen holder 5 may be moved forwardly or rearwardly to, respectively, decrease or increase its distance from the sensitized plate (not shown).

One of the difficulties in the type of screen holder device shown in Fig. 4 is that the screen holder 5 is very often not uniformly spaced from the sensitized plate at all four corners. That is, there exists the tendency at the three corners— such as the upper one shown in Fig. 4, at which the sub-frame 5 is merely guided in its movement and not positively moved—of the frame 5 to disposed itself at distances more or less variant from the desired distance as indicated by scale 10 and imparted to the lead-screw 6 and the corner of the frame 5 which is positively moved for adjustment.

The improved screen holder of Fig. 1 overcomes the foregoing objections and also provides a simpler and cheaper holder. It comprises an open frame 14 of rectangular outline having four peripheral sides 15 from which inwardly project borders 16 framing large central opening 17. The frame borders 16 are tapped at the four corners or at points substantially midway on each of its four sides, of the frame 14 to receive the threaded end of flat-head machine screws 18. The sub-frame 19, which is merely a rectangular frame having a large central opening 20 aligned with central opening 17 of main frame 14 and of outside dimensions such that it may be received within main frame 14, is apertured and countersunk at its four corners, as shown, to receive the flat-heads of screws 18. The headed ends of the screws 18 are rotatably received in the said countersunk apertures of sub-frame 19. So that axial movement of machine screws 18 as they are individually screwed in or out of the tapped holes in borders 16 of the main frame, will impart that movement to sub-frame 19, the sub-frame is held between the said heads of the screws 18 and a pair of nuts 21 and 22 on each screw. Nuts 21 and 22 are not tightly screwed against the sub-frame 19, but leave sufficient play between them and the screw heads to permit the screws to freely turn. The second nut 22 serves as a lock-nut to hold the pair in their said predetermined position on the screws. A third nut 23 is provided on each screw to enable the screws, after being adjusted, to be locked in adjusted position.

Sub-frame 19 is rabbeted at 24 to receive screen 25 which may be held in place, as by clip fingers 26. To adjust the distance between the screen 25 and the emulsion side of a sensitized plate 27, the nuts 23 are loosened and the screws 18 screwed in or out of main frame 14 (by a screwdriver received in the slots of the flat-heads of the screws) to move screen holder 19 to the required position; whereupon the nuts 23 are again tightened to hold the screen in the adjusted position.

A modified form of improved screen holder is shown in Fig. 3 wherein a rectangular frame 28 having a central opening 29 is provided with a series of rabbeted steps or ledges 30 adapted to receive screens 25 of different outside dimensions. The stepped rabbets 30 are so dimensioned from the front (left, Fig. 3) of the frame that the screen received in a particular rabbet will be at the proper distance from the front of the frame (and from the emulsion side of sensitized plate 27) as required by the particular line screen. Moreover, a screen of a given number of lines will have outside dimensions such that it can be received only in a predetermined rabbet which will hold it at the proper distance from the front of the frame. A screen of the desired numbers of lines, such as screen 25 shown in Fig. 3 (which, incidentally, is shown in the rabbet nearest the front of frame 28 and hence closest to the sensitized plate) is held securely in its particular rabbet by any suitable means as by short strips 31 pivotly held to the back of frame 28 by screws 32 and provided at their distal ends with setscrews 33, the ends of which bear against the screen, as shown.

The improved screen of Fig. 1 or Fig. 3 may be used with vertical enlargers for printing halftone plates, as illustrated in Fig. 2, where a sensitized plate 27 placed on a table support 34 is presented under the lens 35 of a vertical enlarger. Upon the sensitized plate and facing its emulsion surface is placed the improved screen holder, which may be either holder 14 of Fig. 1 or 28 of Fig. 3, and which holds the selected screen. The improved screen holder is provided with a projecting rim or a plurality of feet 36 which space the holder, and more particularly its screen, the proper distance from the emulsion face of sensitized plate 27.

Recurring to the present type of holder already described with reference to Fig. 4, another difficulty in its use results from the fact that adjustment must be made in accordance with the scale (10) readings, which frequently results in mis-adjustment because of inaccurracy in reading the scale. This difficulty is obviated by the use of a gauge block 37 provided with steps 38 which serves in adjusting the lead-screw 6 without the need of observing scale 10. The gauge block 37 is provided with a rear enlargement 39 apertured to slidably receive a pin 40 secured to and upstanding from a rear extension 41 of main frame 1. Guided and located by the cooperation of apertured enlargement 39 and pin 40 the gauge block 37 is positioned behind the rear end of the lead-screw 6 with the proper one of its steps 38 presented thereto and secured in place by means of set-screw 42. Hence, by manipulating knurled nut 9 to bring the end of the lead screw against the presented ledge of the gauge 37, the screen holder 5 will be adjusted to the selected distance from the front of frame 1.

I claim:

1. Means for selectively photoprinting in halftone a sensitized plate upon which an image is projected by light reflected from a subject, comprising a frame having a central rectangular opening the edges of which are successively rabbeted and thereby provide a plurality of stepped surfaces of decreasing periphery from the front to the rear portion of said frame, said frame being adapted to be fixedly positioned before and in parallelism with said plate with the rear portion of said frame nearest said plate, and a plurality of screens of different peripheral dimensions and of different line-counts, the periphery of each such screen being an index of the line-count thereof and the line-count of said screens decreasing as the peripheries thereof increase, the screen of greatest line-count having substantially the periphery of the smallest of such surfaces and each other screen having a periphery substantially that of another of said surfaces, so that any surface against which a screen is fitted constitutes a gage to insure that said screen is properly positioned at a distance from said plate in accordance with the line-count of said screen.

2. The means of claim 1 including clamps mounted on said frame and adapted to hold any one of said screens firmly against that one of said surfaces having a periphery substantially equal to that one of said screens.

3. Means for selectively photoprinting in halftone a sensitized plate upon which an image is projected by light reflected from a subject, comprising a frame within which are provided a plurality of stepped surfaces decreasing in periphery from the front to the rear of said frame, said frame being adapted to be fixedly positioned before and in parallelism with said plate with the rear portion of said frame nearest said plate, and a plurality of screens of different periphery and of different line-count, the periphery of each such screen being an index of the line-count thereof and the line-count of said screens increasing as the periphery thereof decreases, the screen of greatest line-count having substantially the periphery of the smallest of such surfaces and each other screen having a periphery substantially that of another of said surfaces, so that any one screen may be fitted only against that one of said surfaces having a periphery substantially equal to that of said screen.

4. The means of claim 3 including clamps mounted on said frame and adapted to hold any one of said screens firmly against that one of said surfaces having a periphery substantially equal to that one of said screens.

HERBERT GELB.

REFERENCES CITED

The following references are of record in the file of this patent:

UNITED STATES PATENTS

| Number | Name | Date |
| --- | --- | --- |
| 552,766 | Levy et al. | Jan. 7, 1896 |
| 564,838 | Parradee | July 28, 1896 |
| 584,182 | Linley | June 8, 1897 |
| 785,373 | Petrie | Mar. 21, 1905 |
| 851,593 | Hatt | Apr. 23, 1907 |
| 1,524,499 | Bassani | Jan. 27, 1925 |
| 2,197,184 | Kemp | Apr. 16, 1940 |

FOREIGN PATENTS

| Number | Country | Date |
| --- | --- | --- |
| 795,388 | France | Jan. 6, 1936 |
| 795,820 | France | Jan. 13, 1936 |
| 453,810 | Great Britain | Sept. 18, 1936 |
| 516,523 | Great Britain | Jan. 4, 1940 |